US008082540B2

(12) United States Patent  
Aguilar et al.

(10) Patent No.: US 8,082,540 B2
(45) Date of Patent: Dec. 20, 2011

(54) METHOD FOR VISUALLY INDICATING PRECEDING AND SUCCEEDING SOURCE CODE LINES THAT ARE EXECUTED IN A GRAPHICAL DEBUGGING ENVIRONMENT

(75) Inventors: Maximino Aguilar, Austin, TX (US); David J. Erb, Austin, TX (US); Sidney J. Manning, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1279 days.

(21) Appl. No.: 11/737,365

(22) Filed: Apr. 19, 2007

(65) Prior Publication Data
US 2008/0263520 A1 Oct. 23, 2008

(51) Int. Cl.
*G06F 9/45* (2006.01)
(52) U.S. Cl. ........................................ 717/125
(58) Field of Classification Search .................. 717/125
See application file for complete search history.

(56) References Cited

U.S. PATENT DOCUMENTS

2003/0056086 A1* 3/2003 Nguyen et al. ................ 712/207
2006/0132822 A1* 6/2006 Walmsley .................... 358/1.14

* cited by examiner

*Primary Examiner* — John Chavis
(74) *Attorney, Agent, or Firm* — Cantor Colburn LLP; Matthew Talpis

(57) ABSTRACT

A method for visually displaying an indicator for preceding and succeeding source code lines being executed within a graphical debugging environment. The method includes displaying within a GUI source code lines for a segment of currently examined source code, displaying a visual indicator that is associated with a presently examined source code line, and determining a previously examined source code line, wherein the location of the previously examined line of source code is determined by the use of information that is associated with the previously examined line of source code. The method further includes displaying a visual indicator that is associated with the previously examined line of source code, determining a next source code line that is to be examined, and displaying a visual indicator that is associated with the next source code line that is to be examined.

6 Claims, 2 Drawing Sheets

FIG. 1

METHOD FOR VISUALLY INDICATING PRECEDING AND SUCCEEDING SOURCE CODE LINES THAT ARE EXECUTED IN A GRAPHICAL DEBUGGING ENVIRONMENT

BACKGROUND OF THE INVENTION

1. Field of the Invention

This invention relates to the program debugging, and particularly to the implementation of visual indicators for source codes lines that are displayed within a graphical program-debugging environment.

2. Description of Background

Within a GUI program-debugging front-end environment, in the event that a program that was being debugged crashed, the debugger would allow a program developer to view the source code at the point of the program stoppage. Conventionally, debuggers have also been configured to execute a program step-by-step, thus allowing a developer to view each line of source code, in addition to ascertaining a current state, of a program as it is executed.

During an optimization phase of compilation the displayed source code lines may be re-ordered to reflect the reorganization of the underlying assembly instructions of the source code. Therefore, while debugging optimized computer source code, many developers frequently are confused when graphical indicators that point to a currently executed source code line displayed by the debugger jump in an indiscriminate manner among the lines of source code. For example, confusion occurs when a developer instructs the debugger to step forward one line, but due to the re-ordering of the instructions, the graphical indicator pointing to a current source code line steps backwards one or more lines, or conversely, skips forward more than one line.

Therefore, a need exists for a means for the implementation of a visual cue system for the indication of a currently executed, a previously executed, and a next executed source code lines that are displayed within a graphical program-debugging environment.

SUMMARY OF THE INVENTION

The shortcomings of the prior art are overcome and additional advantages are provided through the provision of a method for the visually displaying an indicator for preceding and succeeding source code lines being executed within a graphical debugging environment. The method comprising displaying within a GUI source code lines for a segment of currently examined source code, displaying a visual indicator that is associated with a presently examined source code line, and determining a previously examined source code line, wherein the location of the previously examined line of source code is determined by the use of information that is associated with the previously examined line of source code. The method further comprises displaying a visual indicator that is associated with the previously examined line of source code, determining a next source code line that is to be examined, and displaying a visual indicator that is associated with the next source code line that is to be examined.

A computer program product corresponding to the above-summarized method is also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution that simplifies a user interface in a graphical program-debugging environment by visually indicting a preceding and succeeding source code lines that are being executed within the graphical debugging environment.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates one example of a screen shot of a GUI interface wherein the preceding and succeeding source code line are highlighted with graphical indicators.

Figure 2:
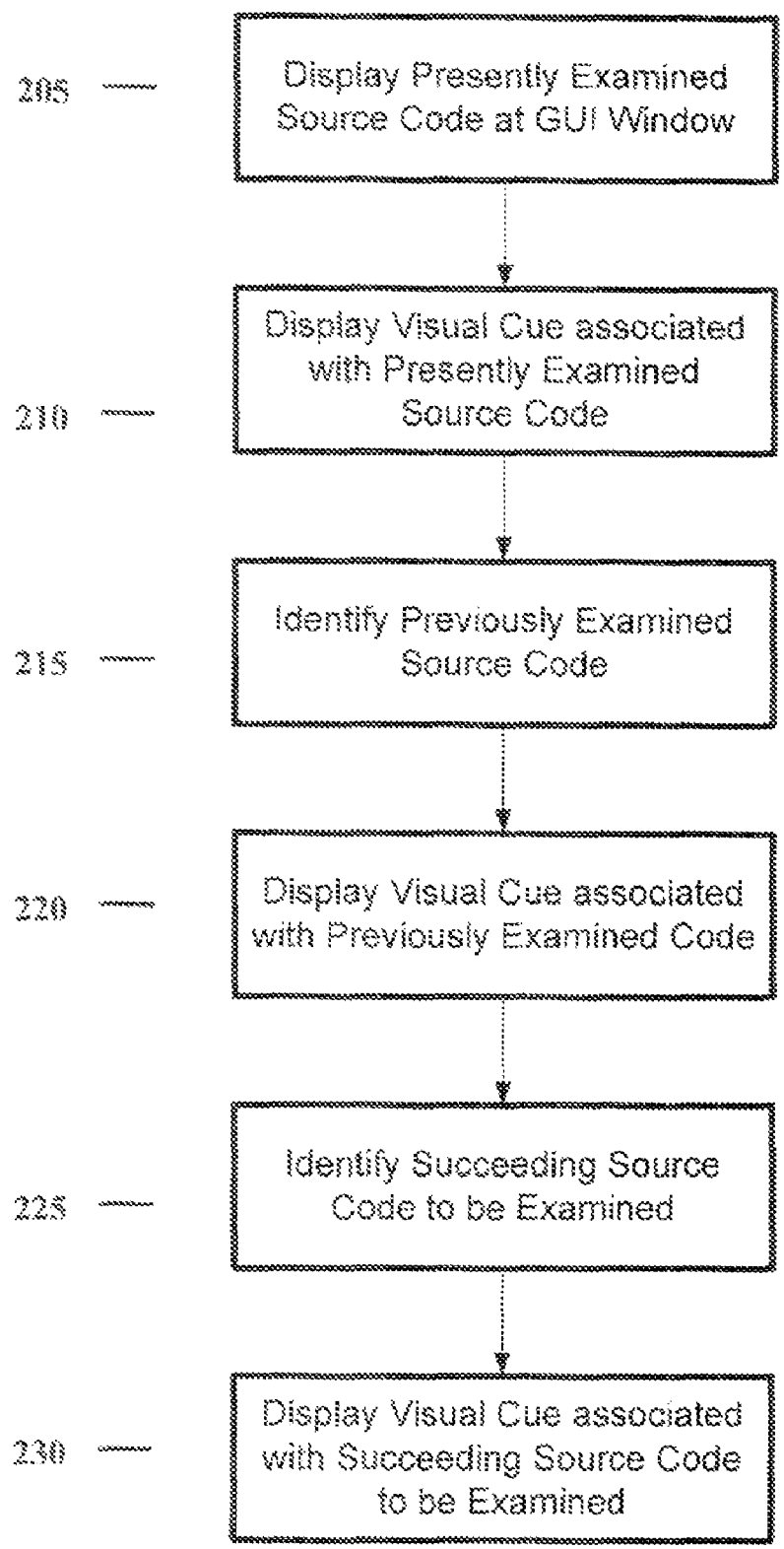
FIG. 2 illustrates one example of a flow diagram detailing aspects of a methodology for the indication of preceding and succeeding source code lines that are executed within embodiments of the present invention.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Aspects of the present invention are carried out within a computing system environment. The computer system as operated by a system user can embody a conventional personal computer system on which an application that is configured to accomplish the objectives of aspects of the present invention is operating. As is conventional, the computer system also includes other hardware and software elements that are conventionally included in personal computer systems.

When involved in the operation of debugging optimized computer source code, many developers frequently are confused when encountering visual indicators that point to a currently executed source code line displayed by the debugger jumping in an indiscriminate manner among the lines of source code when the indicator moves highlight a subsequent source code line that is executed. For example, confusion can occur when a developer instructs the debugger to step forward one line, but due to the re-ordering of the optimized instructions, the graphical indicator pointing to a current source code line steps backwards one or more lines, or conversely, skips forward more than one line.

Aspects of the present invention provide a solution for the above-described problem. Within embodiments of the present invention a visual cue is displayed in a GUI that is displaying the currently executed code lines of currently executed source code. The present invention provides a visual cue, wherein the visual cue can highlight a currently executed source code line, a previously executed source code line, and a succeeding (next) source code line that is to be executed.

The present invention accomplishes these inventive aspects by examining the current program debugging information that has been compiled by the debugging program and associated with the inspected program. By examining a program's debugging information, a determination can be made as to where the next line of source code instruction will be located, and subsequently a visual indicator can be associated with the next line of source code.

Typically, each line of source code is comprised of one or more assembly language instructions. As part of a program debugging operation during a source code optimization procedure lines of source code can be re-ordered during the compilation phase of the optimization. The program debug information that a compiler accumulates associates each line of assembly instruction with a line of source code. This information is subsequently used to generate visual cues, the visual cues indicating to a viewer what line of source code is currently being executed in a program debugging procedure. Additionally, this same compiled debugging information can be used to generate visual cues that indicate what lines of source code have been previously viewed/executed and what source code line will be the next executed line of source code.

Within aspects of the present invention, in order to track the locations of past executed source code lines, the debugger implements a one-entry buffer. The one-entry buffer contains the source code line of the last source code line instruction that was executed. Further, the debugger always identifies the current source code line that is being executed. The determination of a next source code line that is to be executed requires that the debugger evaluate and determine the upcoming instruction sequence. This aspect is possible because the debugger has already identified the currently executed source code line.

Figure 1:
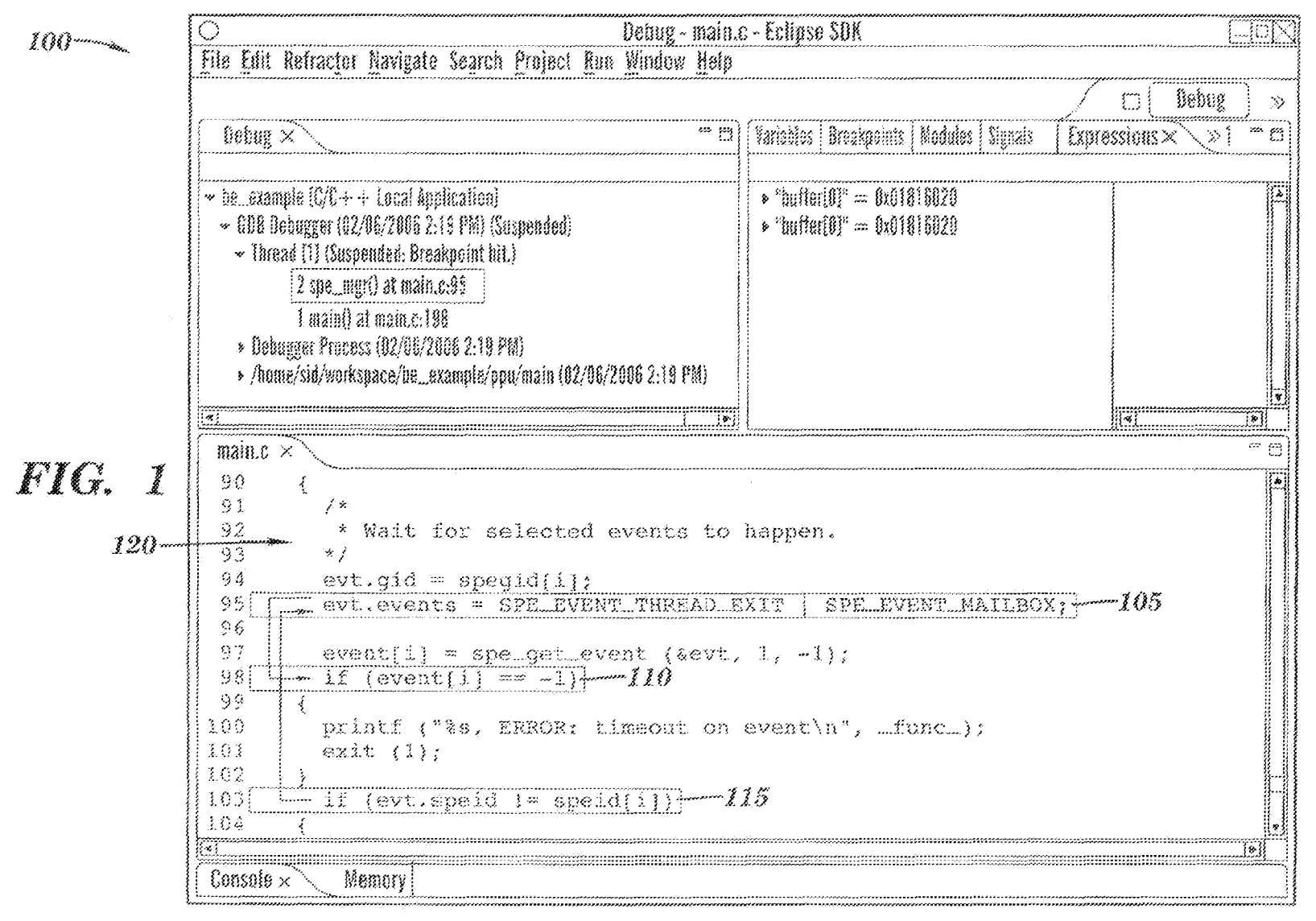

Turning now to the drawings in greater detail, it will be seen that FIG. 1 is screen shot 100 of a GUI interface wherein a currently executed source code line 105, a preceding source code line 115, and a succeeding source code line 110 are highlighted and pointed to with graphical indicator cues. Within aspects of the present invention, differing lines of source code (i.e., current, preceding, and succeeding) can be indicated by color-coded highlights, wherein each state of source code is represented by a different color. Further, as seen in FIG. 1, arrow cues are displayed, wherein the arrow cues are implemented to visually guide a viewer to preceding 115 and succeeding 110 lines of executed source code. Within further aspects of the present invention, the arrow cues can be configured to indicate when a highlighted source code line resides beyond the viewing parameters of the GUI window 120 in which the source code lines are displayed. Therefore, allowing for a viewer to scroll the GUI window 120 in an upward or downward direction in order to view the indicated source code text.

FIG. 2 shows a flowchart detailing aspects of a method for visually displaying an indicator for preceding and succeeding source code lines being executed within a graphical debugging environment. At step 205, the source code lines for a segment of currently examined source code are displayed within a GUI. Next, at step 210, a visual indicator that is associated with a presently examined source code line 105 is displayed. At step 215, the previously examined source code line 115 is determined, wherein the location of the previously examined line of source code 115 is determined by the use of information that is associated with the previously examined line of source code 115.

At step 220, a visual indicator that is associated with the previously examined line of source code 115 is displayed. Next, a step 225, a succeeding source code line 110 that is to be examined is determined, and at step 230, a visual indicator that is associated with the next source code line that is to be examined is displayed.

One or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed:

1. A method for visually displaying an indicator for preceding and succeeding source code lines being executed within a graphical debugging environment, the method comprising:
   displaying within a GUI source code lines for a segment of currently examined source code;
   displaying a visual indicator that is associated with a presently examined source code line;
   determining a previously examined source code line, wherein the location of the previously examined line of source code is determined by the use of information that is associated with the previously examined line of source code;
   displaying a visual indicator that is associated with the previously examined line of source code;
   determining a next source code line that is to be examined; and
   displaying a visual indicator that is associated with the next source code line that is to be examined.

2. The method of claim 1, wherein the visual indicators that are associated with the previously examined and next to be examined source code lines are configured to visually indicated that the previously examined or next to be examined source code lines are situated beyond the displayed range of the current segment of source code that is displayed within the GUI.

3. The method of claim 2, wherein the visual indicators that are associated with the currently examined source code line, the previously examined source code line, and the next source code line to be examined are color-coded with respective colors for the identification of each source code line.

4. A computer program product that includes a computer readable medium useable by a processor, the medium having stored thereon a sequence of instructions which, when executed by the processor, causes the processor to visually display an indicator for preceding and succeeding source code lines that are being executed within a graphical debugging environment by:

displaying within a GUI source code lines for a segment of currently examined source code;
displaying a visual indicator that is associated with a presently examined source code line;
determining a previously examined source code line, wherein the location of the previously examined line of source code is determined by the use of information that is associated with the previously examined line of source code;
displaying a visual indicator that is associated with the previously examined line of source code;
determining a next source code line that is to be examined; and
displaying a visual indicator that is associated with the next source code line that is to be examined.

5. The computer program product of claim 4, wherein the visual indicators that are associated with the previously examined and next to be examined source code lines are configured to visually indicated that the previously examined or next to be examined source code lines are situated beyond the displayed range of the current segment of source code that is displayed within the GUI.

6. The computer program product of claim 5, wherein the visual indicators that are associated with the currently examined source code line, the previously examined source code line, and the next source code line to be examined are color-coded with respective colors for the identification of each source code line.

* * * * *